(No Model.) 2 Sheets—Sheet 1.
J. M. PICKERING.
MACHINE FOR REMOVING DOWN FROM FEATHERS.
No. 426,955. Patented Apr. 29, 1890.
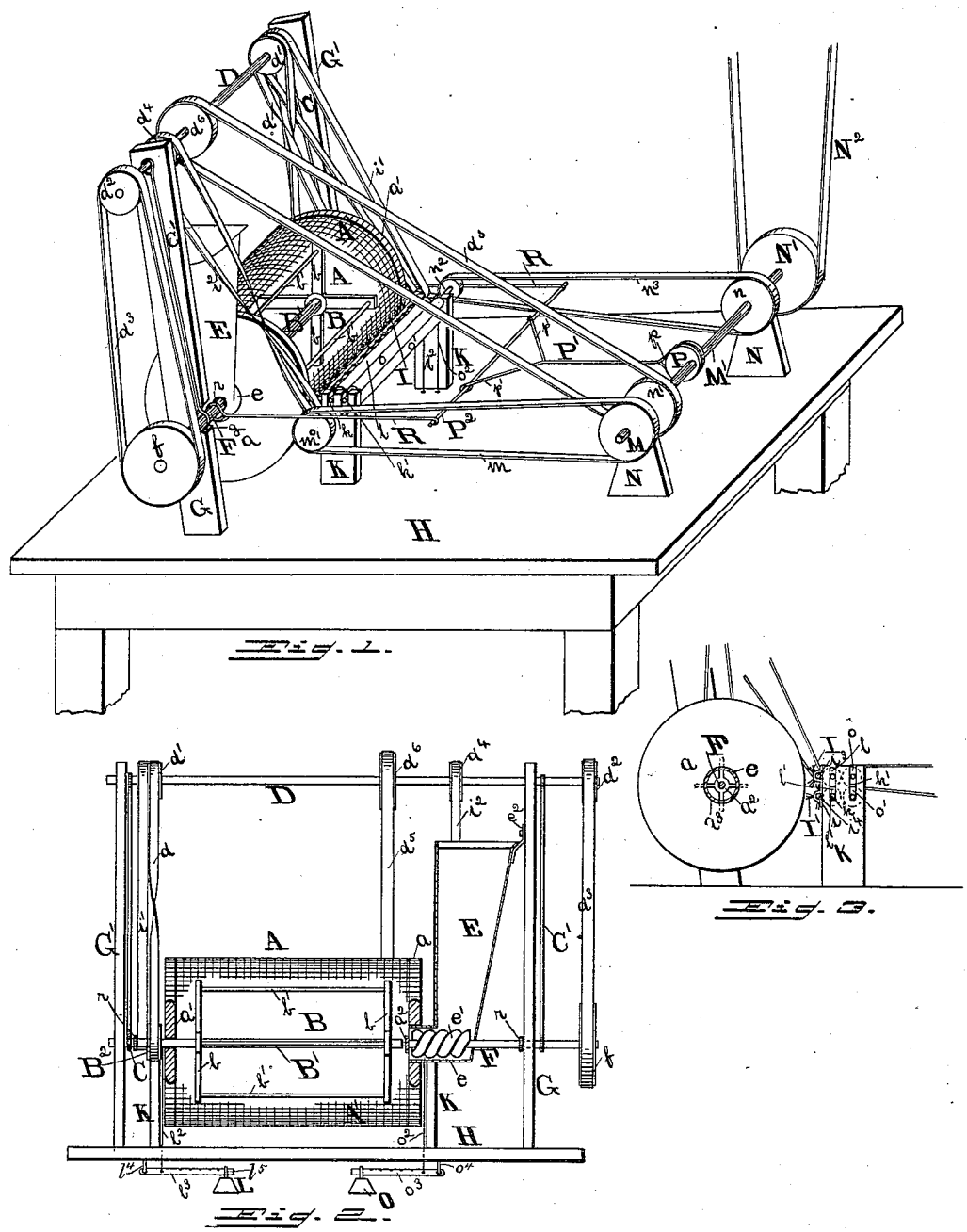
WITNESSES
INVENTOR (No Model.) 2 Sheets—Sheet 2.
J. M. PICKERING.
MACHINE FOR REMOVING DOWN FROM FEATHERS.
No. 426,955. Patented Apr. 29, 1890.
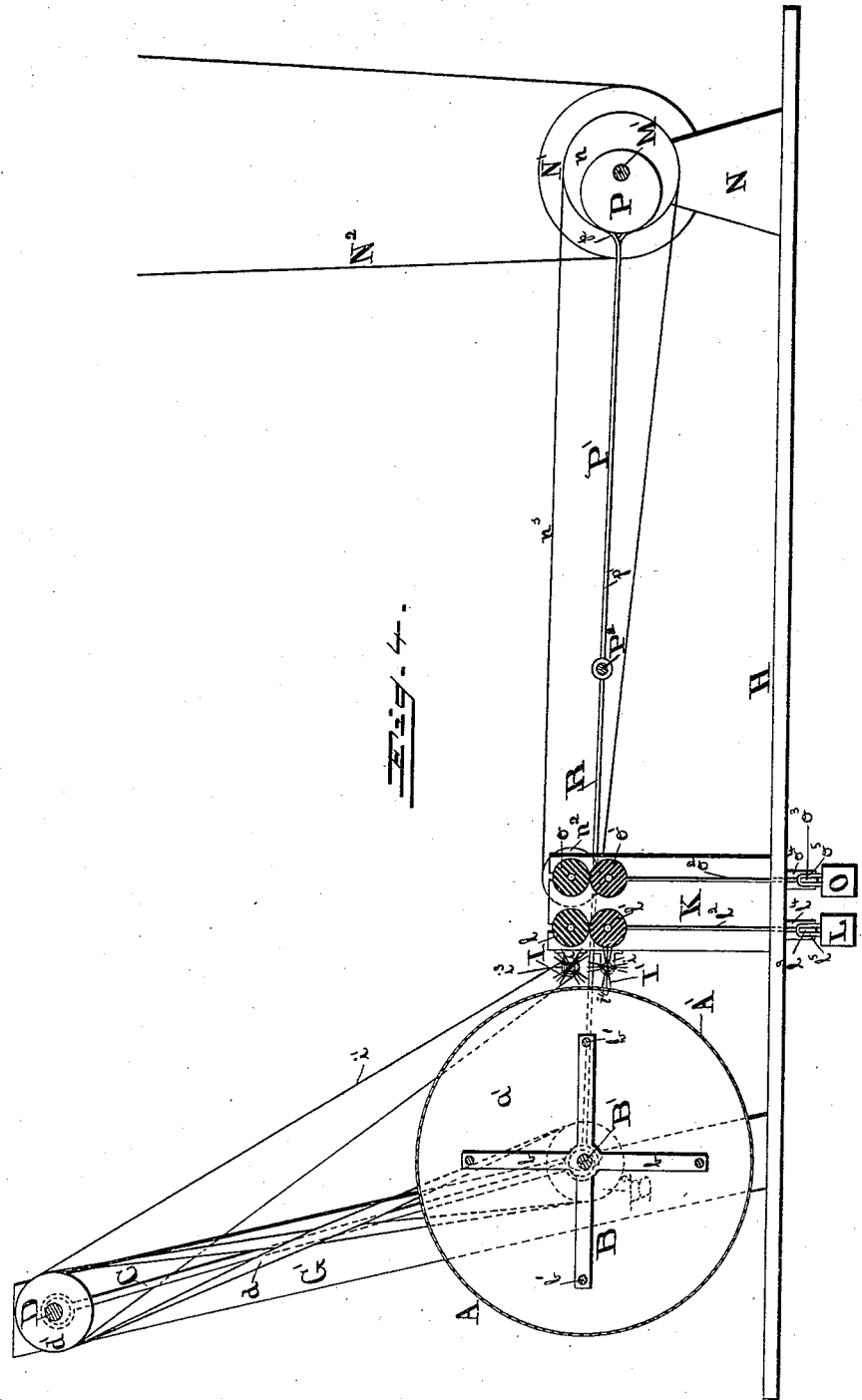
WITNESSES
Jennie S. Powell.
J. Milnor Walmsley
INVENTOR
Joseph M. Pickering,
By his Attorney
Wm S. Powell

United States Patent Office.

JOSEPH M. PICKERING, OF PHILADELPHIA, PENNSYLVANIA.

MACHINE FOR REMOVING DOWN FROM FEATHERS.

SPECIFICATION forming part of Letters Patent No. 426,955, dated April 29, 1890.

Application filed September 9, 1889. Serial No. 323,369. (No model.)

*To all whom it may concern:*

Be it known that I, JOSEPH M. PICKERING, a citizen of the United States, residing at Philadelphia, in the county of Philadelphia and State of Pennsylvania, have invented certain new and useful Improvements in Machines for Removing Down from Feathers; and I do hereby declare that the following is a full, clear, and exact description of the invention.

My invention has relation to machines for the removal of the downy and other growth from the quills of feathers, and has for its object to provide new and efficient means for attaining such removal.

My invention consists in the provision of a rotary woven-wire or foraminated cylinder or drum having a solid head at each of its ends and containing a dasher adapted to rotate horizontally in the same axis with said cylinder but in an opposite direction thereto, the effect of the opposite rotation of the cylinder and dasher being the gradual working centrifugally of the feathers contained in the cylinder toward the periphery of the cylinder, the dasher operating to agitate and keep in constant motion said feathers, which, when brought into contact or friction with each other by such agitation, will travel naturally with their butts in advance and in opposite directions until said butts protrude through the openings therefor in the periphery of the cylinder, and are prevented from traveling farther by the growth on the quills. When the feathers have reached the last-mentioned positions, they are removed therefrom by a pair of oppositely-rotating brushes arranged in close relation with the outside of the cylinder, the bristles of which seize and carry the feathers into such position that they will be grasped by and passed between a pair of oppositely-rotating rolls of rubber or other similar substance, which rolls revolve slowly and guide said feathers between or into the grasp of another pair of rubber rolls of greater speed, the pressure of the slow rolls being sufficient to prevent the feathers from being drawn from between them prematurely or at a speed greater than their rotation. At the same time the fast rolls will grasp so much of the feathers as protrudes from between the slow rolls and strip the soft growth from the quills, while they are retarded by the slow rolls, as above suggested, for the reason that a slight draft on the down or like growth of a feather in the direction of its butt will serve to entirely separate said down and the quill, such operation continuing as long as the feathers are within the grasp of the slow rolls.

My invention further consists in the provision of means whereby the cylinder shall be afforded only an intermittent operative engagement with the removing brushes, the purpose of which will hereinafter appear.

My invention still further consists in certain details of construction and combinations of parts, as hereinafter specifically described and claimed.

Referring to the accompanying drawings, wherein Figure 1 is a perspective view of the complete machine, with the wire-netting partly torn away for convenience of illustration. Fig. 2 is an end elevation of the machine, with the netting torn, as above, and the heads of the cylinder partly in section, also the hopper for said cylinder. Fig. 3 is a side elevation of the brushes and rubber rolls and the cylinder, the spout of the hopper being in section, as is also the cylinder-shaft, and one of the brush and roll pulleys removed. Fig. 4 is a vertical longitudinal section of the machine complete.

A represents the cylinder or drum having the solid heads $a$ $a'$ and the wire-netting $A'$, secured to said heads and completely encircling the same, the space between them affording a receptacle for the feathers and being of sufficient extent to allow of the free rotation of the dasher B, secured on its shaft $B'$, and provided with the arms $b$ and the cross-bars $b'$. One end of said shaft is supported and journaled in the hanger C, which is secured on the counter-shaft D, and the other end is supported and journaled in the spider $a^2$, secured inside of head $a$ and extending across the central opening $a^3$ therein, which opening allows of the entrance of the spout $e$ of the hopper E and the free rotation of the head $a$ round said spout. Secured on shaft $B'$ outside of head $a'$ is a pulley $B^2$ which receives motion from the broad or double pulley $d'$ on shaft D, through the twisted belt $d$.

F represents the cylinder-shaft, which is integral with or secured to the spider $a^2$, and its outer end is supported and journaled in the hanger C', which is also secured on shaft D. Thus it will be seen the cylinder A is journaled on shaft B' at the center of head $a'$, and is secured to shaft F through the medium of spider $a^2$, and both said shafts are journaled in hangers, which afford a swinging support for said cylinder.

Shaft F passes through an opening in the spout $e$, as shown in Fig. 2, and has secured thereon between said opening and spider $a^2$ a worm $e'$, which serves to force the feathers which are placed in the hopper into the cylinder and avoids the clogging up of the spout and packing of feathers therein.

G G' represent the standards, to the former of which is pivotally secured the hopper at $e^2$, and in which is journaled the shaft D, said standards being secured at their bases to the table H, and said shaft having secured thereon at one end a pulley $d^2$ which transmits its motion through the straight belt $d^3$ to the pulley $f$ on the shaft F, so that by the use of a twisted belt for the dasher-shaft pulley and a straight belt for the cylinder-shaft pulley, and both said belts receiving motion from the same shaft, it will be readily understood that the motions of the cylinder and dasher are opposite.

I I' represent rotary brushes journaled at their ends in straps $i$ on the edges of standards K, and having their direction of rotation opposite by reason of their pulleys on their shafts $i^3$ $i^4$, receiving motion from the pulleys $d'$ $d^4$ on the shaft D through a straight belt $i'$ and a twisted belt $i^2$, respectively.

$l$ $l'$ represent a pair of rubber rolls journaled at their ends in notches $k$ in the standards K and the shaft of the upper roll being encircled at each end by wires $l^2$, which pass down through openings in the table H and are attached to levers $l^3$, which are hinged to lugs $l^4$, secured to the under side of said table and having thereon the weights L, said levers being notched for reception of the hooks $l^5$ of said weights, the adjustability of the weights permitting of variation in the pressure between the rolls as occasion requires, said rolls $l$ $l'$ receiving motion from the pulley M on the main shaft M', through the belt $m$ and pulley $m'$, said shaft being journaled in standards N on the table H, and having thereon the pulley $n'$, which transmits the motion of the main shaft to the counter-shaft D through the belt $d^5$ and pulley $d^6$.

$o$ $o'$ represent another pair of rubber rolls journaled in notches $k'$ in the standards K, the shaft of the upper one of which being encircled at each end by wires $o^2$ passing through the table and attached to the levers $o^3$, hinged to the lugs $o^4$ secured to the under side of the table, said levers having each a weight O thereon, the purpose of which is for attaining the same end as the hereinbefore-mentioned weights L.

While I have described the upper roll of each pair as being provided with a pair of weighted wires—one at each end—I have for convenience of illustration shown but one of each pair, as shown in Fig. 2.

Rolls $o$ $o'$ receive their motion from the pulley $n$ on the main shaft through the belt $n^3$ and the pulley $n^2$ on the upper one of said rolls, said pulley being of less diameter than that of the pulley $m'$, and both receive motion from pulleys of the same size on said main shaft. Consequently the speed of rolls $o$ $o'$ is twice as great as that of rolls $l$ $l'$, the effect of which on feathers passing between them is that while the slow rolls are holding the feathers and slowly feeding them to the fast rolls said fast rolls will grasp the downy or soft growth of said feathers and pull against the resistance of the slow rollers, thus accomplishing the tearing or stripping of said growth from the quills, this stripping operation enduring as long as there are feathers between the slow rolls.

As will be readily understood, when the brushes have come into operative relation with the cylinder they will extract feathers protruding through several rows of openings in the netting because of their bristles having rather an extended sweep on said netting, and are not very close together around their shafts, so that the feathers on one row of bristles will not become entangled with those on the next row. Therefore it is unnecessary to have the cylinder and brushes in constant contact. I have accordingly provided the swinging supports C C' for the cylinder, which are swung on the shaft D and afford bearings for the cylinder and dasher-shafts F and B', the latter being out of alignment with the former, so as to facilitate the return by gravity of the cylinder A and the said shafts to their normal positions in the notches $g$ in the front edges of standards G G'. This swinging operation I accomplish through the employment of an eccentric P, secured on the shaft M', said eccentric having an annular groove for the reception of the looped end $p$ of the forked connection P', and said shaft receives motion from an engine or other source of power through the pulley N' and the belt $N^2$. The ends $p'$ of the forks of connection P' are secured to the transverse rod $P^2$, which in turn has secured to each of its ends the rods R with eyes $r$ formed on their inner ends, which encircle shafts B' and F, and said rods and connection serve to transmit a reciprocating motion from said eccentric to the cylinder and said shafts for the purpose hereinbefore explained.

While I have shown and described the use of two pairs of cylindrical rolls, it may be found desirable to employ more than two pairs; also, one of the two pairs may be larger than the other, and the shafts of each rotate at the same rate of speed, all of which of course are embraced by the spirit of my invention. It may be found desirable also to provide a suitable receptacle for the quills when stripped, so placed that the same will drop into the same after leaving the rolls, which receptacle can be removed from time to time as occasion requires, and another receptacle at some distance away from the rolls may be provided for the reception of the down after it is removed from the quills, said down being blown into said receptacle by a light draft of air from a fan or blower, in which case it will be necessary to incase the entire apparatus, or so much thereof as is above the table, except the mouth of the hopper and the main driving-pulley.

Having fully described my invention, what I claim is—

1. In a machine for removing down from feathers, the combination of a pair of oppositely-rotating suitably-operated rolls of rubber or similar material in rolling contact and means for holding the feathers while said rolls by their pressure grasp and strip the down from the quills.

2. In a machine for removing down from feathers, the combination of a pair of suitably-operated oppositely-rotating rubber rolls in rolling contact, and a pair of similar rolls of faster speed, the slower rolls operating to retard the progress of feathers passed between them, while the faster rolls by their pressure grasp and strip the down from the quills.

3. In a machine for removing down from feathers, the combination of a suitable feather-receptacle, a suitably-operated rotary brush or brushes for receiving the feathers from the receptacle, and suitable devices for receiving the feathers from the brush or brushes and the removal of the down from the quills thereof.

4. In a machine for removing down from feathers, the combination of a suitably-operated rotary cylinder or receptacle with openings for the egress of feathers, a pair of suitably-operated oppositely-rotating brushes for receiving the feathers from said openings, and suitable devices for receiving the feathers from the brushes and the removal of down from the quills thereof.

5. In a machine for removing down from feathers, the combination of a suitably-operated rotary cylinder or receptacle provided with openings for the egress of the feathers and having therein an agitating device adapted to cause said feathers to enter said openings butts first, a suitably-operated rotary brush or brushes for removing said feathers from said openings, and suitable devices for receiving the feathers from the brushes and the removal of down from the quills thereof.

6. In a machine for removing down from feathers, the combination of a suitably-operated rotary cylinder or receptacle provided with openings for the egress of the feathers and having therein a suitably-operated oppositely-rotating dasher, a pair of slow oppositely-rotating rubber rolls, a pair of fast oppositely-rotating rubber rolls, and a pair of suitably-operated oppositely-rotating brushes intermediate said cylinder and rolls, for the purpose described.

7. In a machine for removing down from feathers, the combination of a rotary cylinder or receptacle provided with openings for the egress of the feathers, a swinging support for said cylinder, a rotary brush or brushes for removing the feathers from said openings, suitable devices for receiving the feathers from the brushes and the removal of down from the quills thereof, and means for bringing the cylinder and brush or brushes intermittently into operative relation, for the purpose described.

8. In a machine for removing down from feathers, the combination of the cylinder A, dasher B, the shafts B' F, the shaft D, the hangers C C', the shaft M', the eccentric P, the forked connection P', the transverse rod $P^2$, the longitudinal rods R, and the brushes I I', and suitable devices for receiving the feathers from said brushes and the removal of down from the quills thereof, substantially as described.

9. In a machine for removing down from feathers, the combination of the cylinder A, the shafts B' F, the dasher B, the shaft D, the hangers C C', the shaft M', the eccentric P, the forked connection P', the rods $P^2$ R, the brushes I I', the rolls $l$ $l'$, the rolls $o$ $o'$, the uprights K, the wires $l^2$ $o^2$, the weighted levers $l^3$ $o^3$, and the table H, substantially as described.

10. In a machine for removing down from feathers, the combination of the cylinder A, the shafts B' F, the dasher B, the shaft D, the hangers C C', the cylinder-heads $a$ $a'$, the uprights G G', the spider $a^2$, the hopper E, the worm $e'$, and the pivotal support $e^2$, means for removing the feathers from said cylinder, and means for the removal of down from the quills thereof, substantially as shown and described.

11. In an apparatus for removing down from feathers, the combination of the cylinder A, the shafts B' F, the netting A', the dasher B, the shaft D, the hangers C C', the uprights G G', the pulleys $d'$ $d^2$ $d^4$ $d^6$, the belts $d$ $d^3$ $d^5$ $i'$ $i^2$, the pulleys $f$ $n'$ $B^2$, the shaft M', the uprights N, the pulleys M N' $n$, the belts $N^2$ $m$, the pulleys $m'$ $n^2$, the eccentric P, the connection P', the rods $P^2$ R, the uprights K, the notches $k$, the brushes I I', journaled in straps $i$ and provided with pulleys for belts $i'$ $i^2$, the rolls $l$ $l'$ $o$ $o'$, the wires $l^2$ $o^2$, the weighted levers $l^3$ $o^3$, the lugs $l^4$ $o^4$, and the table H, substantially as described.

In testimony whereof I have hereunto set my hand this the 8th day of August, A. D. 1889.

JOSEPH M. PICKERING.

Witnesses:
R. DALE SPARHAWK,
WM. H. POWELL.